US008671733B2

(12) United States Patent
Lowe (10) Patent No.: US 8,671,733 B2
(45) Date of Patent: Mar. 18, 2014

(54) CALIBRATION PROCEDURE CONSIDERING GAS SOLUBILITY

(75) Inventor: Jeffrey Chih-Hou Lowe, Cupertino, CA (US)

(73) Assignee: Intermolecular, Inc., San Jose, CA (US)

( * ) Notice: Subject to any disclaimer, the term of this patent is extended or adjusted under 35 U.S.C. 154(b) by 174 days.

(21) Appl. No.: 13/324,558

(22) Filed: Dec. 13, 2011

(65) Prior Publication Data

US 2013/0145816 A1    Jun. 13, 2013

(51) Int. Cl.
  *G01F 25/00* (2006.01)
(52) U.S. Cl.
  CPC .................................. *G01F 25/0007* (2013.01)
  USPC ............................................. 73/1.16; 73/1.36
(58) Field of Classification Search
  USPC ........................ 73/1.03, 1.16, 1.36, 1.73, 1.74
  See application file for complete search history.

(56) References Cited

U.S. PATENT DOCUMENTS

| 3,958,443 | A | * | 5/1976 | Berrettini ........................ 73/1.34 |
| 5,061,639 | A | * | 10/1991 | Lung et al. .................... 436/164 |
| 5,379,627 | A | * | 1/1995 | Bates, Jr. ....................... 73/1.16 |
| 5,744,695 | A | * | 4/1998 | Forbes .......................... 73/1.35 |
| 5,796,012 | A | * | 8/1998 | Gomi et al. .............. 73/861.357 |
| 6,606,573 | B2 | * | 8/2003 | Wheeler ........................ 702/56 |
| 6,742,993 | B2 | | 6/2004 | Savard et al. |
| 6,745,135 | B2 | * | 6/2004 | Keilty et al. .................... 702/45 |
| 6,997,032 | B2 | * | 2/2006 | Mattar .......................... 73/1.34 |
| 7,114,368 | B2 | * | 10/2006 | Klosterman et al. ........... 73/1.88 |
| 7,275,007 | B2 | * | 9/2007 | Lesjak ............................ 702/87 |
| 7,491,286 | B2 | | 2/2009 | Kagan et al. |
| 7,878,765 | B2 | | 2/2011 | Gonnella et al. |
| 2003/0167822 | A1 | * | 9/2003 | Johnson et al. ................ 73/1.16 |
| 2004/0216509 | A1 | * | 11/2004 | Antonijevic ................... 73/1.16 |
| 2006/0225483 | A1 | * | 10/2006 | Bhullar et al. ................. 73/1.74 |
| 2007/0067116 | A1 | * | 3/2007 | Rothman et al. ............... 702/55 |

OTHER PUBLICATIONS

USPTO; Office Action for U.S. Appl. No. 12/239,555 mailed on Sep. 27, 2011; 11 pages.
USPTO; Office Action for U.S. Appl. No. 12/239,555 mailed on Mar. 12, 2012; 11 pages.

* cited by examiner

*Primary Examiner* — David A Rogers (57) ABSTRACT

A method of calibrating a flow meter is provided. The method initiates with identifying a calibration fluid for a processing fluid. The calibration fluid has physical properties in common with the processing fluid with the exception of an outgassing characteristic. The method includes adding the calibration fluid to a vessel, where the vessel is in fluid communication with the flow meter and a withdrawal unit. The vessel is pressurized and the calibration fluid is withdrawn from the vessel through the flow meter and into the withdrawal unit, where the withdrawing performed by the withdrawal unit. A withdrawal volume per unit time measured by the flow meter is compared to a withdrawal volume per unit time controlled and set through the withdrawal unit.

8 Claims, 5 Drawing Sheets

CALIBRATION PROCEDURE CONSIDERING GAS SOLUBILITY

BACKGROUND

To achieve the desired performance enhancement for each successive generation of silicon integrated circuits (ICs), semiconductor manufacturing has become increasingly reliant on new materials and their integration into advanced process sequences. Unfortunately, typical semiconductor manufacturing equipment is not well suited for materials exploration and integration. Issues impacting the use of typical semiconductor manufacturing equipment include difficulty in changing process materials and chemicals rapidly, limited ability to integrate and sequence multiple materials or chemicals in a single reactor or process chamber, high equipment cost, large sample size (300 mm wafer) and inflexible process/reactor configurations. To complement traditional manufacturing tools, a need has arisen for process equipment that facilitates fast testing of new materials and materials processing sequences over a wide range of process conditions.

Equipment facilitating this fast testing must deliver accurate quantities of process fluids in order to achieve accurate results, especially where small volumes of liquids are utilized. In some instances the delivery equipment for the liquid, e.g., a flow meter, is calibrated by the manufacturer. However, this calibration is not capable of being performed under the conditions that the delivery equipment is used by an end user. This may lead to inaccuracies in fluid delivery when the delivery equipment is employed by the end user under actual processing conditions different than the calibration conditions.

It is within this context that the embodiments arise.

SUMMARY

Embodiments of the present invention provide a calibration method for adjusting a flow meter while considering gas solubility of the fluids processed by the flow meter. Several inventive embodiments of the present invention are described below.

In one aspect of the invention, a method of calibrating a flow meter is provided. The method initiates with identifying a calibration fluid for a processing fluid. The calibration fluid has physical properties in common with the processing fluid with the exception of an outgassing characteristic. The method includes adding the calibration fluid to a vessel, where the vessel is in fluid communication with the flow meter and a withdrawal unit. The vessel is pressurized and the calibration fluid is withdrawn from the vessel through the flow meter and into the withdrawal unit, where the withdrawing performed by the withdrawal unit. A withdrawal volume per unit time measured by the flow meter is compared to a withdrawal volume per unit time measured through the withdrawal unit.

Other aspects of the invention will become apparent from the following detailed description, taken in conjunction with the accompanying drawings, illustrating by way of example the principles of the invention.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The following paragraphs generally describe one or more implementations of various technologies and techniques directed to ensuring accurate measurement of liquid flow rates by a flow meter. In one implementation, the flow meter may be part of a larger combinatorial processing tool. The flow meter may be coupled to a line which carries pressurized liquid from a liquid source in the combinatorial processing tool. In some circumstances fluids that have relatively high amounts of dissolved gases can be inaccurately measured by a flowmeter. Accordingly, implementations of various techniques described herein account for inaccuracies due to outgassing fluids processed by the flow meter. In this manner, various techniques described herein may be used to ensure accurate measurements of liquid flow rates by a flow meter.

In one implementation, a method for calibrating the dispense accuracy of a flow meter for a fluid that outgases or has a tendency to form bubbles is provided. The fluid is withdrawn from a source through the flow meter and into a withdrawal unit, such as a motorized syringe. The flow meter is calibrated based on using deionized water at the factory in many instances. The technique described herein employs the withdrawal unit to pull the liquid from the pressurized source through the flowmeter into a barrel of the withdrawal unit. A substitute fluid is utilized for the calibration. The substitute fluid is similar (i.e. within about 10%) in physical characteristics to the actual fluid e.g., density, viscosity, etc., but does not have the tendency to outgas or form bubbles.

One or more implementations of various techniques for ensuring accurate measurement of liquid flow rates by a flow meter will now be described in more detail with reference to FIGS. 1-4 in the following paragraphs.

The discussion below is directed to certain specific implementations. It is to be understood that the discussion below is only for the purpose of enabling a person with ordinary skill in the art to make and use any subject matter defined now or later by the patent "claims" found in any issued patent herein.

Semiconductor manufacturing typically includes a series of processing steps such as cleaning, surface preparation, deposition, patterning, etching, thermal annealing, and other related unit processing steps. The precise sequencing and integration of the unit processing steps enables the formation of functional devices meeting desired performance metrics such as efficiency, power production, and reliability.

As part of the discovery, optimization and qualification of each unit process, it is desirable to be able to i) test different materials, ii) test different processing conditions within each unit process module, iii) test different sequencing and integration of processing modules within an integrated processing tool, iv) test different sequencing of processing tools in executing different process sequence integration flows, and combinations thereof in the manufacture of devices such as integrated circuits. In particular, there is a need to be able to test i) more than one material, ii) more than one processing condition, iii) more than one sequence of processing conditions, iv) more than one process sequence integration flow, and combinations thereof, collectively known as "combinatorial process sequence integration", on a single monolithic substrate without the need of consuming the equivalent number of monolithic substrates per material(s), processing condition(s), sequence(s) of processing conditions, sequence(s) of processes, and combinations thereof. This can greatly improve both the speed and reduce the costs associated with the discovery, implementation, optimization, and qualification of material(s), process(es), and process integration sequence(s) required for manufacturing.

Systems and methods for High Productivity Combinatorial (HPC) processing are described in U.S. Pat. No. 7,544,574 filed on Feb. 10, 2006, U.S. Pat. No. 7,824,935 filed on Jul. 2, 2008, U.S. Pat. No. 7,871,928 filed on May 4, 2009, U.S. Pat. No. 7,902,063 filed on Feb. 10, 2006, and U.S. Pat. No. 7,947,531 filed on Aug. 28, 2009 which are all herein incorporated by reference. Systems and methods for HPC processing are further described in U.S. patent application Ser. No. 11/352,077 filed on Feb. 10, 2006, claiming priority from Oct. 15, 2005, U.S. patent application Ser. No. 11/419,174 filed on May 18, 2006, claiming priority from Oct. 15, 2005, U.S. patent application Ser. No. 11/674,132 filed on Feb. 12, 2007, claiming priority from Oct. 15, 2005, and U.S. patent application Ser. No. 11/674,137 filed on Feb. 12, 2007, claiming priority from Oct. 15, 2005 which are all herein incorporated by reference.

HPC processing techniques have been successfully adapted to wet chemical processing such as etching and cleaning. HPC processing techniques have also been successfully adapted to deposition processes such as physical vapor deposition (PVD), atomic layer deposition (ALD), and chemical vapor deposition (CVD).

Figure 1:
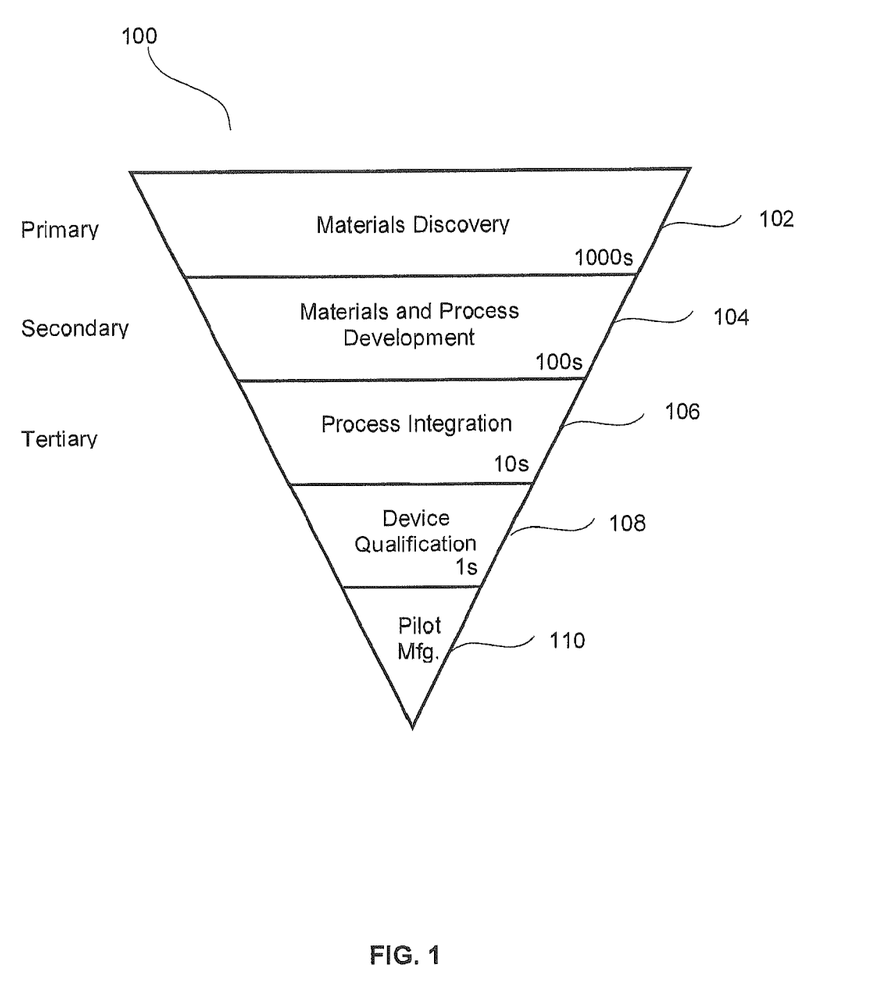
FIG. 1 illustrates a schematic diagram for implementing combinatorial processing and evaluation using primary, secondary, and tertiary screening.

FIG. 1 illustrates a schematic diagram, 100, for implementing combinatorial processing and evaluation using primary, secondary, and tertiary screening. The schematic diagram, 100, illustrates that the relative number of combinatorial processes run with a group of substrates decreases as certain materials and/or processes are selected. Generally, combinatorial processing includes performing a large number of processes during a primary screen, selecting promising candidates from those processes, performing the selected processing during a secondary screen, selecting promising candidates from the secondary screen for a tertiary screen, and so on. In addition, feedback from later stages to earlier stages can be used to refine the success criteria and provide better screening results.

For example, thousands of materials are evaluated during a materials discovery stage, 102. Materials discovery stage, 102, is also known as a primary screening stage performed using primary screening techniques. Primary screening techniques may include dividing substrates into coupons and depositing materials using varied processes. The materials are then evaluated, and promising candidates are advanced to the secondary screen, or materials and process development stage, 104. Evaluation of the materials is performed using metrology tools such as electronic testers and imaging tools (i.e., microscopes).

The materials and process development stage, 104, may evaluate hundreds of materials (i.e., a magnitude smaller than the primary stage) and may focus on the processes used to deposit or develop those materials. Promising materials and processes are again selected, and advanced to the tertiary screen or process integration stage, 106, where tens of materials and/or processes and combinations are evaluated. The tertiary screen or process integration stage, 106, may focus on integrating the selected processes and materials with other processes and materials.

The most promising materials and processes from the tertiary screen are advanced to device qualification, 108. In device qualification, the materials and processes selected are evaluated for high volume manufacturing, which normally is conducted on full substrates within production tools, but need not be conducted in such a manner. The results are evaluated to determine the efficacy of the selected materials and processes. If successful, the use of the screened materials and processes can proceed to pilot manufacturing, 110.

The schematic diagram, 100, is an example of various techniques that may be used to evaluate and select materials and processes for the development of new materials and processes. The descriptions of primary, secondary, etc. screening and the various stages, 102-110, are arbitrary and the stages may overlap, occur out of sequence, be described and be performed in many other ways.

This application benefits from High Productivity Combinatorial (HPC) techniques described in U.S. patent application Ser. No. 11/674,137 filed on Feb. 12, 2007 which is hereby incorporated for reference in its entirety. Portions of the '137 application have been reproduced below to enhance the understanding of the present invention. The embodiments described herein enable the application of combinatorial techniques to process sequence integration in order to arrive at a globally optimal sequence of semiconductor manufacturing operations by considering interaction effects between the unit manufacturing operations, the process conditions used to effect such unit manufacturing operations, hardware details used during the processing, as well as materials characteristics of components utilized within the unit manufacturing operations. Rather than only considering a series of local optimums, i.e., where the best conditions and materials for each manufacturing unit operation is considered in isolation, the embodiments described below consider interactions effects introduced due to the multitude of processing operations that are performed and the order in which such multitude of processing operations are performed when fabricating a device. A global optimum sequence order is therefore derived and as part of this derivation, the unit processes, unit process parameters and materials used in the unit process operations of the optimum sequence order are also considered.

The embodiments described further analyze a portion or sub-set of the overall process sequence used to manufacture a semiconductor device. Once the subset of the process sequence is identified for analysis, combinatorial process sequence integration testing is performed to optimize the materials, unit processes, hardware details, and process sequence used to build that portion of the device or structure. During the processing of some embodiments described herein, structures are formed on the processed substrate that are equivalent to the structures formed during actual production of the semiconductor device. For example, such structures may include, but would not be limited to, contact layers, buffer layers, absorber layers, or any other series of layers or unit processes that create an intermediate structure found on semiconductor devices. While the combinatorial processing varies certain materials, unit processes, hardware details, or process sequences, the composition or thickness of the layers or structures or the action of the unit process, such as cleaning, surface preparation, deposition, surface treatment, etc. is substantially uniform through each discrete region. Furthermore, while different materials or unit processes may be used for corresponding layers or steps in the formation of a structure in different regions of the substrate during the combinatorial processing, the application of each layer or use of a given unit process is substantially consistent or uniform throughout the different regions in which it is intentionally applied. Thus, the processing is uniform within a region (inter-region uniformity) and between regions (intra-region uniformity), as desired. It should be noted that the process can be varied between regions, for example, where a thickness of a layer is varied or a material may be varied between the regions, etc., as desired by the design of the experiment.

The result is a series of regions on the substrate that contain structures or unit process sequences that have been uniformly applied within that region and, as applicable, across different regions. This process uniformity allows comparison of the properties within and across the different regions such that the variations in test results are due to the varied parameter (e.g., materials, unit processes, unit process parameters, hardware details, or process sequences) and not the lack of process uniformity. In the embodiments described herein, the positions of the discrete regions on the substrate can be defined as needed, but are preferably systematized for ease of tooling and design of experimentation. In addition, the number, variants and location of structures within each region are designed to enable valid statistical analysis of the test results within each region and across regions to be performed.

Figure 2:
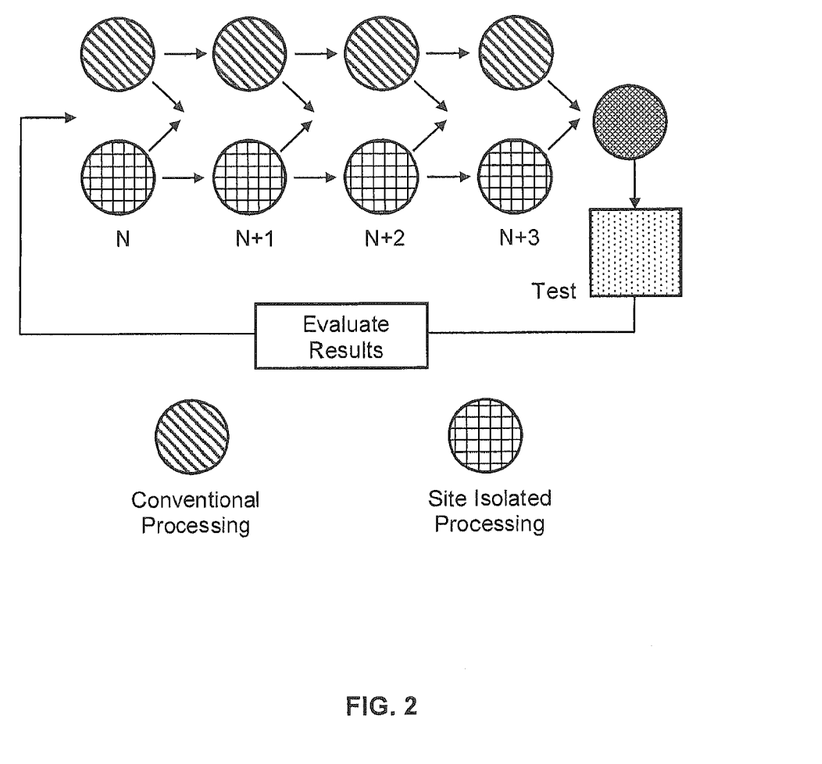
FIG. 2 is a simplified schematic diagram illustrating a general methodology for combinatorial process sequence integration that includes site isolated processing and/or conventional processing in accordance with some embodiments of the invention.

FIG. 2 is a simplified schematic diagram illustrating a general methodology for combinatorial process sequence integration that includes site isolated processing and/or conventional processing in accordance with one embodiment of the invention. In one embodiment, the substrate is initially processed using conventional process N. In one exemplary embodiment, the substrate is then processed using site isolated process N+1. During site isolated processing, an HPC module may be used, such as the HPC module described in U.S. patent application Ser. No. 11/352,077 filed on Feb. 10, 2006. The substrate can then be processed using site isolated process N+2, and thereafter processed using conventional process N+3. Testing is performed and the results are evaluated. The testing can include physical, chemical, acoustic, magnetic, electrical, optical, etc. tests. From this evaluation, a particular process from the various site isolated processes (e.g. from steps N+1 and N+2) may be selected and fixed so that additional combinatorial process sequence integration may be performed using site isolated processing for either process N or N+3. For example, a next process sequence can include processing the substrate using site isolated process N, conventional processing for processes N+1, N+2, and N+3, with testing performed thereafter.

It should be appreciated that various other combinations of conventional and combinatorial processes can be included in the processing sequence with regard to FIG. 2. That is, the combinatorial process sequence integration can be applied to any desired segments and/or portions of an overall process flow. Characterization, including physical, chemical, acoustic, magnetic, electrical, optical, etc. testing, can be performed after each process operation, and/or series of process operations within the process flow as desired. The feedback provided by the testing is used to select certain materials, processes, process conditions, and process sequences and eliminate others. Furthermore, the above flows can be applied to entire monolithic substrates, or portions of monolithic substrates such as coupons.

Under combinatorial processing operations the processing conditions at different regions can be controlled independently. Consequently, process material amounts, reactant species, processing temperatures, processing times, processing pressures, processing flow rates, processing powers, processing reagent compositions, the rates at which the reactions are quenched, deposition order of process materials, process sequence steps, hardware details, etc., can be varied from region to region on the substrate. Thus, for example, when exploring materials, a processing material delivered to a first and second region can be the same or different. If the processing material delivered to the first region is the same as the processing material delivered to the second region, this processing material can be offered to the first and second regions on the substrate at different concentrations. In addition, the material can be deposited under different processing parameters. Parameters which can be varied include, but are not limited to, process material amounts, reactant species, processing temperatures, processing times, processing pressures, processing flow rates, processing powers, processing reagent compositions, the rates at which the reactions are quenched, atmospheres in which the processes are conducted, an order in which materials are deposited, hardware details of the gas distribution assembly, etc. It should be appreciated that these process parameters are exemplary and not meant to be an exhaustive list as other process parameters commonly used in semiconductor manufacturing may be varied.

As mentioned above, within a region, the process conditions are substantially uniform, in contrast to gradient processing techniques which rely on the inherent non-uniformity of the material deposition. That is, the embodiments, described herein locally perform the processing in a conventional manner, e.g., substantially consistent and substantially uniform, while globally over the substrate, the materials, processes, and process sequences may vary. Thus, the testing will find optimums without interference from process variation differences between processes that are meant to be the same. It should be appreciated that a region may be adjacent to another region in one embodiment or the regions may be isolated and, therefore, non-overlapping. When the regions are adjacent, there may be a slight overlap wherein the materials or precise process interactions are not known, however, a portion of the regions, normally at least 50% or more of the area, is uniform and all testing occurs within that region. Further, the potential overlap is only allowed with material of processes that will not adversely affect the result of the tests. Both types of regions are referred to herein as regions or discrete regions.

Figure 3:
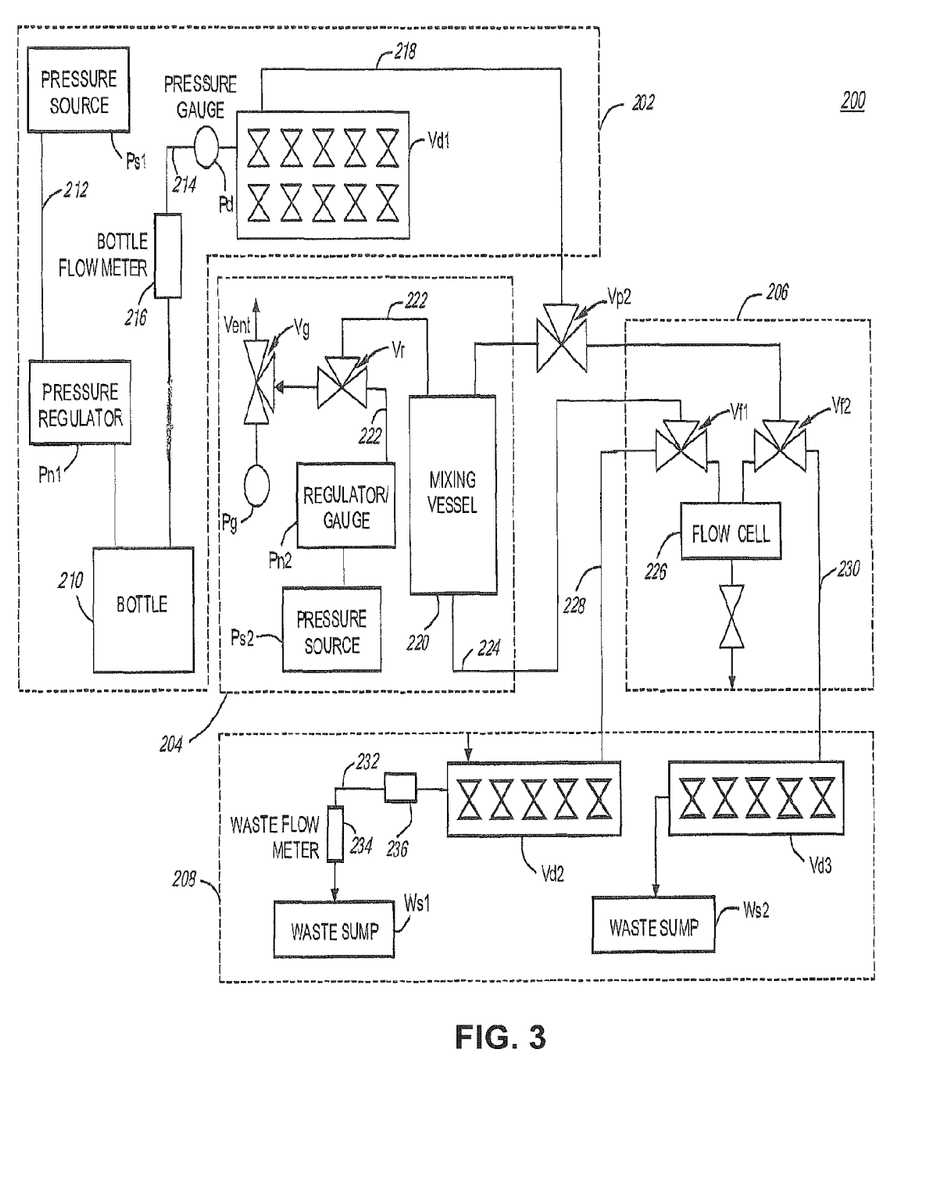
FIG. 3 illustrates a schematic diagram of a combinatorial processing tool according to implementations of one or more technologies described herein.

FIG. 3 illustrates a schematic diagram of a combinatorial processing tool 200 according to implementations of one or more technologies described herein. The combinatorial processing tool 200 illustrated in FIG. 2 may be a wet processing tool and may be a portion of a larger combinatorial processing tool, such as the MCSIR tool or F20/F30 tool of the Assignee. Portions of the combinatorial processing tool 200 may be replicated several times within a larger combinatorial processing tool such that a larger number of variations in substrate processing conditions may be achieved.

The combinatorial processing tool 200 illustrated in FIG. 3 may be divided into four parts. A chemical supply portion 202 may supply chemicals to a chemical mixing portion 204 and a reactor portion 206. The chemical mixing portion 204 may be used for mixing various chemicals, e.g., liquid chemicals, into solutions which may be applied to various locations on a substrate in the reactor portion 206. The reactor portion 206 may contain a site isolated reactor and may apply the solutions to the substrate or portions of the substrate and may subject the substrate or portions thereof to various processing conditions. The reactor portion 206 may be coupled to a waste portion 208 of the combinatorial processing tool 200. The waste portion 208 may be used to capture waste chemicals after substrate processing.

The supply portion 202 of the combinatorial processing tool 200 may include a bottle 210 containing a liquid chemical. The chemical may be applied to the substrate or may be mixed with another chemical to form a solution which is to be applied to the substrate. As illustrated in FIG. 3, a pressure source PS1 and a pressure regulator Pn1 may be coupled to the bottle 210 via a pressure supply line 212. Together the pressure source PS1 and the pressure regulator Pn1 may provide a pressurized gas, such as Nitrogen, at a regulated pressure to the bottle 210 via the supply line 212. In this manner, the pressurized gas may be used to push the liquid chemical out of the bottle 210 and into a line 214 connecting the bottle 210 to a supply manifold Vd1. A flow meter 216 and a pressure transducer Pd may be coupled to the line 214. The flow meter 216 may monitor the flow rate of liquids through the line 214 and the pressure gauge Pd may monitor the pressure within the line 214. The flow rate of fluids in the combinatorial processing tool 200 is measured to ensure desired processing characteristics. For example, in some combinatorial processing operations, chemicals may need to be flowed past a processed region of a substrate at a desired rate. The desired rate can be maintained by monitoring output of the flow meter.

The supply manifold Vd1 may contain a plurality of two-way and/or multi way valves connecting the bottle 210 to a plurality of mixing cells/vessels within the combinatorial processing tool 200. Furthermore, in lieu of a single bottle 210, a plurality of bottles containing various chemicals may be coupled to the supply manifold Vd1 such that the supply manifold Vd1 may supply various chemicals to multiple mixing portions or multiple site isolated reactor portions of the combinatorial processing tool 200. Additionally, in lieu of a single supply manifold Vd1, a plurality of supply manifolds Vd1 may be present in the combinatorial processing tool 200. Together the plurality of bottles, valves, and supply manifolds may enable the supply of various chemicals and chemical mixtures to the mixing portion 204 and the site isolated reactor portion 206 of the combinatorial processing tool 200.

The line 214 coupling the bottle 210 to the supply manifold Vd1 may be coupled to a valve, e.g., a multi-way valve, within the supply manifold Vd1 such that the supply manifold Vd1 may control the flow of chemicals from the bottle 210 to the mixing portion 204 or the reactor portion 206 of the combinatorial processing tool 200. The output of the valve in the supply manifold Vd1 may be coupled via a line 218 to a valve Vp2. The valve Vp2 may be a multi-way valve which controls the flow of fluids/chemicals from the supply manifold Vd1 into either the mixing portion 204, site-isolated reactor portion 206, or both.

The mixing portion 204 of the combinatorial processing tool 200 is provided to allow thorough solution mixing of chemicals provided by supply portions. In order to form a solution, a plurality of chemicals may flow from the supply portion 202, e.g., the bottle 210, into different mixing vessels in the mixing portion 204. The mixing vessel 220 may then mix the chemicals to form solutions. The mixing portion 204 may also provide accurate temperature and pH control of a solution being mixed in the mixing portion 204.

A pressure source Ps2 and a pressure regulator Pn2 may be coupled to the mixing vessel 220 via a valve Vr and a supply line 222. Together the pressure source PS2 and the pressure regulator Pn2 may provide a pressurized gas, e.g., Nitrogen, at a regulated pressure to the mixing vessel 220 via the valve Vr and the supply line 222. An outlet of the valve Vr may be coupled to another valve Vg to vent pressure within the supply line 222. The pressure in the supply line 222 may be measured by a pressure transducer Pg.

The pressurized gas provided by the pressure source Ps2 and the pressure regulator Pn2 may push the mixed chemicals in the mixing vessel 220 through a line 224 and into the site-isolated reactor portion 206 of the combinatorial processing tool 200. The mixed chemicals may flow through a valve Vf1 and into a flow cell 226. The flow cell 226 may be one portion of a site isolated reactor, and may be used to apply the mixed chemicals to a portion or portions of a substrate under processing in the site-isolated reactor portion 206 of the combinatorial processing tool 200. The flow cell 226 may have a series of parallel cells forming site-isolated reactors which may be configured to effect site-isolated processing on proximate regions on the substrate. Chemicals may also be provided to the flow cell 226 and, consequently, to a substrate via the supply manifold Vd1.

After exposing the substrate to the desired amount of chemicals, excess or waste chemicals may exit the flow cell 226 through valve Vf1 and waste line 228 or through valve Vf2 and waste line 230. Waste line 228 may be coupled to a waste manifold Vd2, and waste line 230 may be coupled to waste manifold Vd3. The waste manifolds may be coupled to waste sumps (e.g., waste sump Ws1 and waste sump Ws2) and the waste manifolds may be used to divert chemicals into specific waste sumps. A waste line 232 may couple a waste manifold Vd2 to a waste sump Ws1. Furthermore, a waste flow meter 234 may be coupled to the waste line 232 to measure a flow rate of waste liquids flowing into the waste sump Ws1.

Additionally, a system 236 for clearing fluids may also be coupled to the waste line 232. As will be described further below with respect to FIG. 3, the system 236 may include a multi-way valve coupled to the waste line 232 and coupled to a pressurized gas source such that the system 236 may periodically pass a pressurized gas through the waste flow meter 236.

The flow meters (e.g., flow meter 216 and flow meter 234) may be any type of flow meter available. For example, the flow meters may be ultrasonic flow meters which measure the travel time of ultrasonic waves through a liquid and calculates a flow rate of the liquid based on the measured travel time of the ultrasonic waves. The flow meters may also be magnetic flow meters which measure changes in a magnetic field applied to a liquid to determine a rate of liquid flow. As described above, a flow meter may measure a flow rate of liquids flowing though the flow meter. For example, flow meter 216 may measure a flow rate of liquid chemicals flowing through the supply line 214. In some circumstances, the process fluid measured by the flow meter may have dissolved gasses and may outgas those dissolved gasses during the delivery process. As a result, the flow meter may provide an inaccurate liquid flow rate measurement as the calibration process did not account for the dissolved gasses and the outgas sing.

A liquid may flow through flow meter 216 because the liquid has been pushed through the flow meter by a pressurized gas. In the combinatorial processing tool illustrated in FIG. 3, the pressure source Ps1 may provide a pressurized gas to the bottle 210 containing the liquid chemical such that the pressurized gas pushes the liquid chemical out of the bottle 210, through the supply line 214 and through the flow meter 216. The liquid chemical including any dissolved gasses may then be pushed through the supply line 214 and through the flow meter 216. As the liquid chemical pass through the supply line 214 and the flow meter 216, the pressure within the line and the flow meter may drop. This pressure drop may occur because a vessel on the other end of the supply line (e.g., the mixing vessel 220) has a pressure less than that of the pressure source. This phenomenon may be caused by the fact that the mixing vessel 220 may be at atmospheric pressure. The drop in pressure may cause the liquid to outgas, i.e., release dissolved gasses downstream from the flow meter and introduce inaccuracies into the measurement provided by the flow meter.

Figure 4:
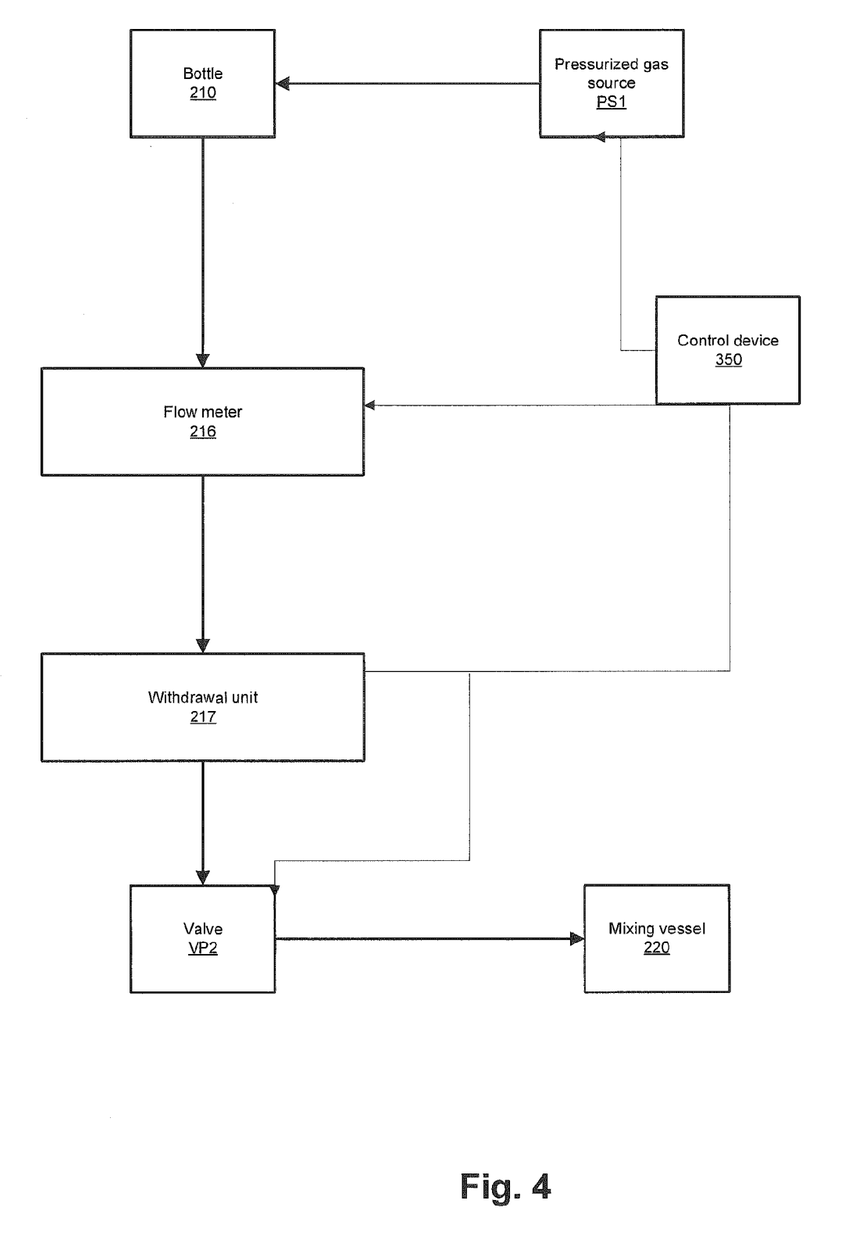
FIG. 4 illustrates a system which may be used to accurately calibrate a flow meter to account for pressure drops and the release of dissolved gases triggered by the pressure drops in accordance with some embodiments of the invention.

FIG. 4 illustrates a system which may be used to accurately calibrate a flow meter to account for pressure drops and the release of dissolved gases triggered by the pressure drops in accordance with some embodiments of the invention. In some embodiments, withdrawal unit 217 may be disposed within the combinatorial processing tool 200 illustrated in FIG. 3, for example on line 218 or 214 for the calibration process. The system illustrated in FIG. 4 provides a pressurized gas source PS1 to bottle 210. Bottle 210 is in fluid communication with flow meter 216. Flow meter 216 is coupled to withdrawal device 217, which in turn is coupled to valve VP2. The outlet of valve VP2 is in fluid communication with mixing vessel 220. In one embodiment, pressurized gas source PS1 pressurizes bottle 210 with a pressure of about 3 pounds per square inch to about 5 pounds per square inch (psi). It should be appreciated that this pressure is exemplary and not meant to be limiting as lesser amounts of pressure or greater amounts of pressure may be utilized.

Downstream from flow meter 216 is a withdrawal device 217 in FIG. 3. Withdrawal device 217 may be a motorized syringe in one embodiment, where the motorized syringe is capable of handling volumes up to 100 milliliters (ml). During the calibration process for flow meter 216 the fluid provided from bottle 210 is withdrawn through the withdrawal device rather than relying on the pressure provided to bottle 210. It should be appreciated that while bottle 210 is pressurized, the pressure may not be sufficient to force the fluid through flow meter 216 and into mixing vessel 220. A control device 350 may also be coupled to the components of FIG. 4 to control the calibration process and record the generated data. The control device 350 may be, for example, a computer system containing one or more processors, memory (e.g., hard disk drive(s), random access memory, etc.), devices for receiving input from a user (e.g., keyboard, mouse, etc.), communication devices (e.g., network controllers, serial ports, etc.), and/or devices for outputting data (e.g., printers, monitors, data storage, etc.). The control device 350 may be configured to receive as input a recipe for processing a substrate or substrates within the combinatorial processing tool. The control device may also be configured to control the operation of the combinatorial processing tool such that the substrate or substrates are processed in a manner specified by the recipe.

Figure 5:
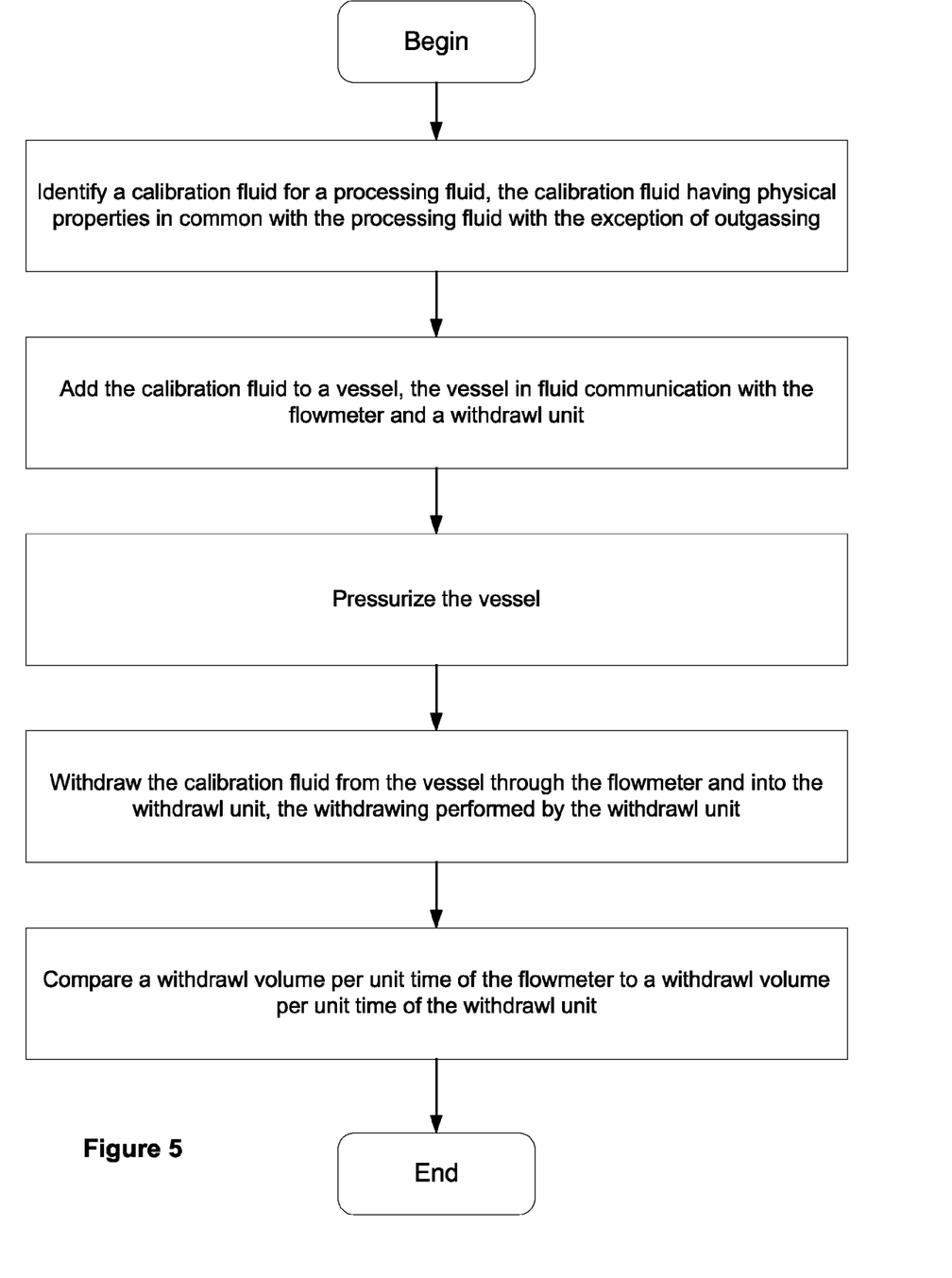
FIG. 5 is a flowchart diagram illustrating method operations for calibrating a flow meter in accordance with some embodiments of the invention.

FIG. 5 is a flowchart diagram illustrating method operations for calibrating a flow meter in accordance with some embodiments of the invention. The method initiates with operation 400 where a calibration fluid is identified for a processing fluid. As mentioned above, the calibration fluid includes similar physical properties to the processing fluid with the exception of gas solubility. The calibration fluid is added to a vessel in operation 402. The vessel is in fluid communication with the flow meter and a withdrawal unit downstream from the flow meter. In one embodiment the withdrawal unit is a motorized syringe. The vessel is then pressurized in operation 404. As mentioned above, the pressure inside the vessel may be maintained at between about 3-5 pounds per square inch. The calibration fluid is withdrawn from the vessel through the flow meter and into the withdrawal unit in operation 406. It should be appreciated that the withdrawing is performed by the withdrawal unit through suction of the calibration through the flow meter and into the withdrawal unit. When the withdrawal is performed through the withdrawal unit a pressure drop is created when the process or calibration fluid enters the chamber of the withdrawal unit. In operation 408 a withdrawal volume per unit time captured from a flow meter reading as compared to withdrawal volume per unit time captured through the withdrawal unit. The discrepancy between the reading on the flow meter and the volume per unit time measured from the withdrawal unit is utilized to calibrate the flow meter. In some embodiments, the time the flow meter runs for the process fluid is adjusted to provide the desired volume of process fluid where the time is based on the rate provided from use of the calibration fluid.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of calibrating a flow meter, comprising:
providing a withdrawal unit having a collection chamber, a flow meter, and a vessel having a first liquid with a first gas solubility, the vessel being in fluid communication with the flow meter and the withdrawal unit, and wherein the flow meter is precalibrated for use with the first liquid;
providing a second liquid, the second liquid having a second gas solubility, the second gas solubility less than the first gas solubility;
replacing the first liquid with the second liquid;
pressurizing the vessel;
withdrawing the second liquid at a known volume per unit time from the vessel through the flow meter and into the collection chamber;
measuring and comparing a withdrawal volume per unit time measured through the flow meter to a withdrawal volume per unit time measured with the withdrawal unit; and
updating calibration parameters of the flow meter for use with the first liquid based on the results of the comparing.

2. The method of claim 1, wherein the collection chamber is a motorized syringe enabling the withdrawing of the second liquid at the known volume per unit time from the vessel.

3. The method of claim 1, wherein the vessel is pressurized to between about 3 pounds per square inch (psi) and about 5 psi.

4. The method of claim 1, wherein the collection chamber has a volume limit of about 100 milliliters.

5. The method of claim 1, wherein the withdrawing includes exposing the second fluid to a pressure drop when entering the collection chamber.

6. The method of claim 1, further comprising adjusting output of the flow meter based on a difference between the withdrawal volume per unit time measured through the flow meter and the withdrawal volume per unit time measured with the withdrawal unit.

7. The method of claim 1, wherein the withdrawal unit applies suction through the flow meter to withdraw the second liquid.

8. A method for performing a combinatorial procedure comprising:
- performing the calibration process as in claim 6;
- washing the vessel and the flow meter;
- filling the vessel with the first liquid; and
- performing a combinatorial first process using the adjusted output of the flow meter.

* * * * *